US008782597B2

(12) United States Patent
Wang et al.

(10) Patent No.: US 8,782,597 B2
(45) Date of Patent: Jul. 15, 2014

(54) ONTOLOGY UPDATING APPARATUS, METHOD AND SYSTEM

(75) Inventors: Lan Wang, Kawasaki (JP); Hiroshi Murayama, Yokohama (JP); Akira Hosokawa, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 23 days.

(21) Appl. No.: 13/428,399

(22) Filed: Mar. 23, 2012

(65) Prior Publication Data
US 2012/0254849 A1 Oct. 4, 2012

(30) Foreign Application Priority Data
Mar. 28, 2011 (JP) .................................. 2011-070795

(51) Int. Cl.
*G06F 17/30* (2006.01)
*G06F 15/00* (2006.01)
(52) U.S. Cl.
USPC ........... 717/108; 717/104; 717/105; 707/737; 715/505
(58) Field of Classification Search
None
See application file for complete search history.

(56) References Cited

U.S. PATENT DOCUMENTS

| 7,055,130 | B2 * | 5/2006 | Charisius et al. ............ 717/108 |
| 7,213,233 | B1 * | 5/2007 | Vinodkrishnan et al. ..... 717/124 |
| 7,962,590 | B1 * | 6/2011 | Or et al. ...................... 709/223 |
| 2005/0086587 | A1 * | 4/2005 | Balz ............................ 715/505 |
| 2006/0184927 | A1 * | 8/2006 | Deblaquiere et al. ........ 717/168 |
| 2009/0013319 | A1 | 1/2009 | Williams et al. |
| 2009/0106748 | A1 * | 4/2009 | Chess et al. .................. 717/168 |
| 2011/0209142 | A1 * | 8/2011 | Wookey ....................... 717/175 |
| 2011/0270838 | A1 * | 11/2011 | Jameson ....................... 707/737 |
| 2012/0266130 | A1 * | 10/2012 | Kinnucan et al. ............ 717/105 |
| 2012/0311523 | A1 * | 12/2012 | Venkataraman et al. ..... 717/104 |
| 2013/0042230 | A1 * | 2/2013 | Little et al. .................. 717/173 |

FOREIGN PATENT DOCUMENTS

| JP | 07-311683 | 11/1995 |
| JP | 2008-117340 | 5/2008 |
| JP | 2008-293486 | 12/2008 |

OTHER PUBLICATIONS

IEC 61970-301 Ed. 3, CDV version, 57/1032/CDV 1, pp. 14-21, (2009).
OMG Unified Modeling Language™ (OMG UML), Infrastructure version 2.3, pp. 149 and 157-170.
IEC 61968-11 57/1058/FPIS @ IEC(E), pp. 15-18.
First Office Action issued by the Japan Patent Office on Jan. 22, 2013 in Japanese Patent Application No. 2011-070795, 6 pages, and English language translation thereof.
0MG Unified Modeling Language ™ (0MG UML), Infrastructure version 2.3, May 2010, pp. 149 and 157-170.
IEC 61968-11 57/1058/FPIS @ IEC(E), Jul. 12, 2010, pp. 15-18.
Extended European Search Report mailed Jul. 5, 2012, in EP Application No. 12161114.9.

* cited by examiner

*Primary Examiner* — Don Wong
*Assistant Examiner* — Mohammad Kabir
(74) *Attorney, Agent, or Firm* — Finnegan, Henderson, Farabow, Garrett & Dunner, LLP

(57) ABSTRACT

According to one embodiment, an ontology updating apparatus includes a generation unit, an updating unit, a detection unit and a notification unit. The generation unit generates updating reference relationship. The updating unit updates a first class and a first package. The detection unit detects, using the updating reference relationship, whether at least one of target packages are comprised in the updating reference packages of the updated first package, the target packages each indicating a package to be updated and associated with the updated first class. The notification unit generates, if there is the target package, an update notice that the target package needs to be updated.

9 Claims, 12 Drawing Sheets

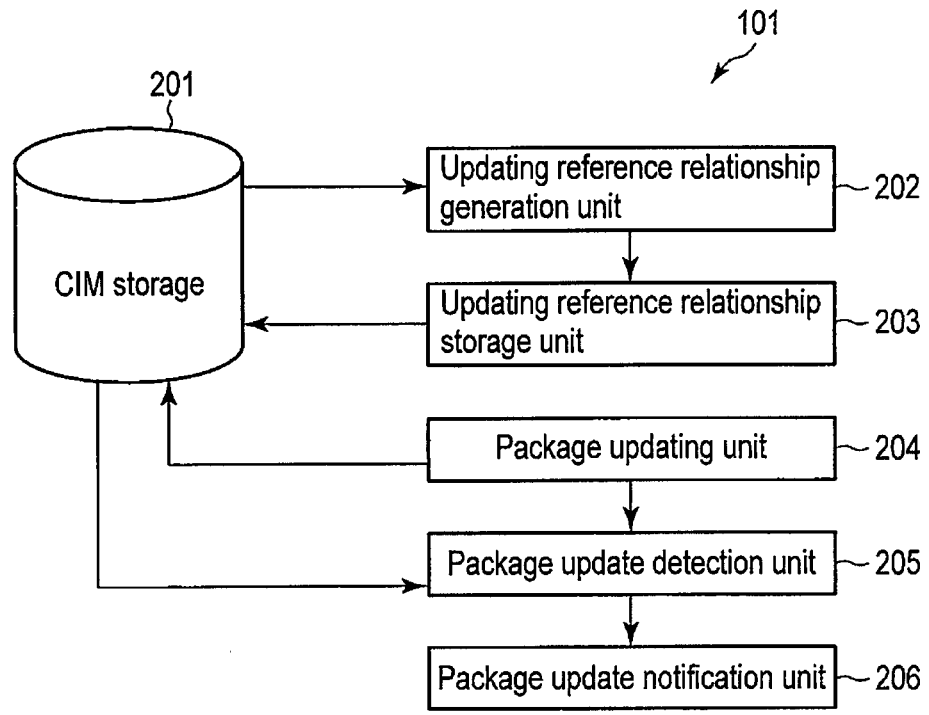
F I G. 2
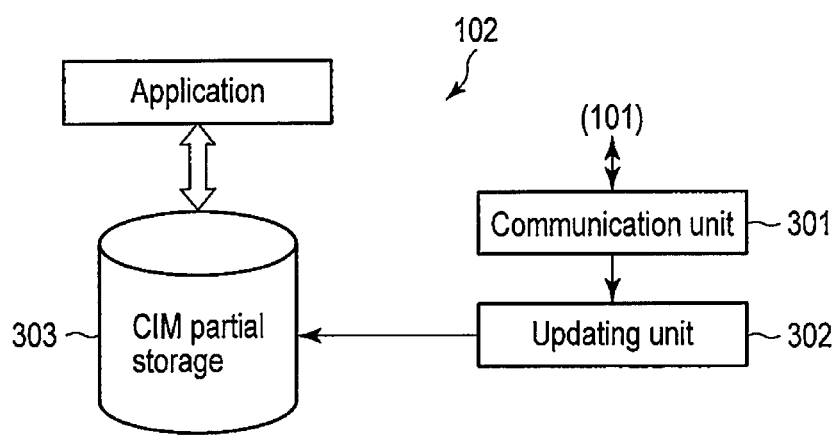
F I G. 3

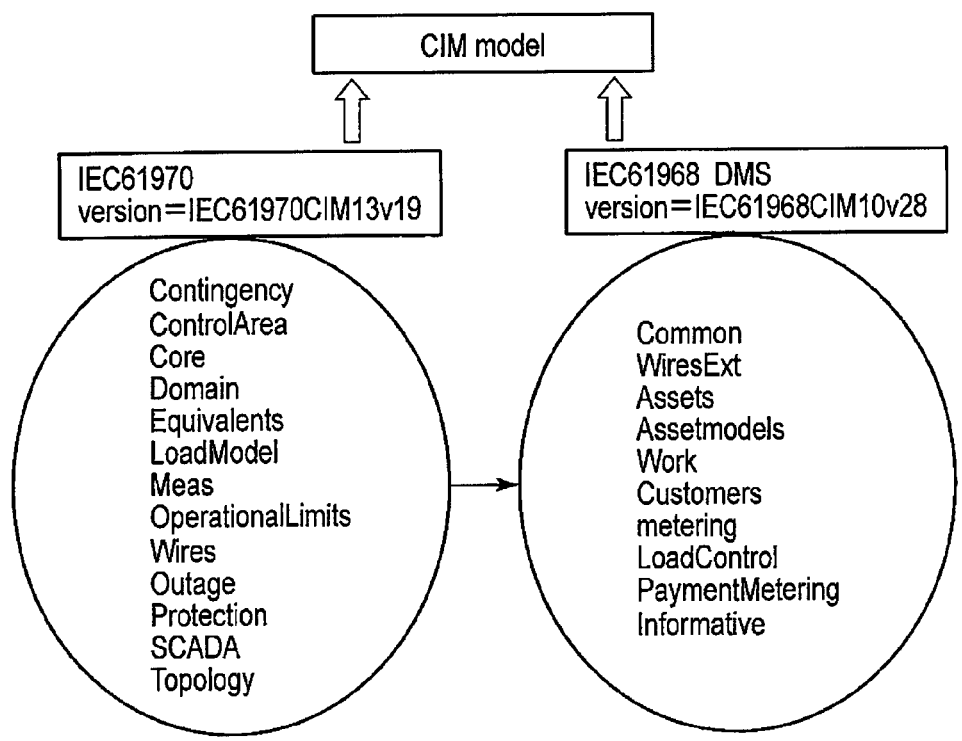
F I G. 4

| 701 | 702 | 703 | 704 |
|---|---|---|---|
| Name | Type | Note | Version |

FIG. 7

| 801 | 802 | 803 | 804 |
|---|---|---|---|
| Name | Type | Note | Version |
| normallyInService | Boolean | The equipment is normally in service. | 1.0 |
| mRID | String | Inherited from:IdentifiedObject | 1.1 |
| name | String | Inherited from:IdentifiedObject | 1.1 |
| localName | String | Inherited from:IdentifiedObject | 1.0 |
| pathName | String | Inherited from:IdentifiedObject | 1.0 |
| aliasName | String | Inherited from:IdentifiedObject | 1.0 |
| descriptiom | String | Inherited from:IdentifiedObject | 2.0 |

FIG. 8

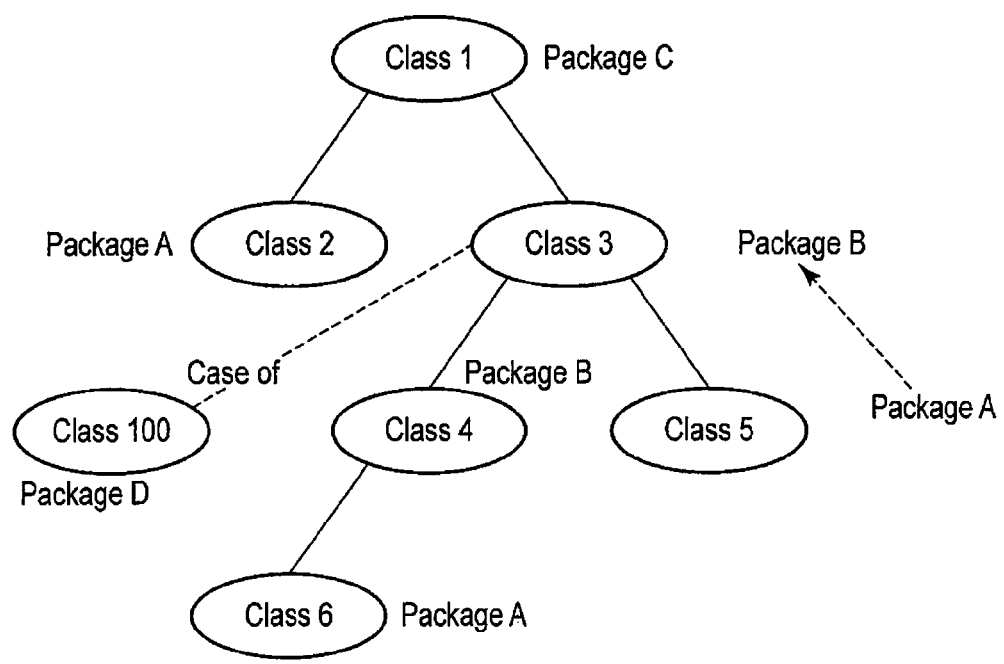
F I G. 10

| | 1101 | 1102 | 1103 | 1104 | 1105 | 1106 | 1107 |
|---|---|---|---|---|---|---|---|
| | Package name | Package code | Package explanation | Package version | Creation date | Updating reference package list (Dependent_by) | Updating reference package {class name} (Package{related_class}) |
| | Package A | Pa001 | Package of A | 1.0 | 2010/08/12 | | |
| | Package B | Pa002 | Package of B | 1.0 | 2010/08/12 | Package A<br>Package D | Package A{Class 3, Class 4}<br>Package D{Class 3} |
| | Package C | Pa003 | Package of C | 1.0 | 2010/08/12 | Package A<br>Package B | Package A{Class 1}<br>Package B{Class 1} |
| | Package D | Pa004 | Package of D | 1.0 | 2010/08/12 | | |
| | Core | Pa005 | Contains the core PowerSystemResource and ConductingEquipment entities shared by all applications plus common collections of those entities. Not all applications require all the Core entities. This package does not depend on any other package except the Domain package, but most of the other packages have associations and generalizations that depend on it. | 1.0 | 2010/08/12 | Wire | Wire{PowersystemResource, EquipmentContauner, Equipment, ConductingEquipment} |
| | Package 10 | Pa006 | Test package | 1.0 | 2010/10/01 | Package 20 (part-whole)<br>Package 30 (case-of) | Package 20{Class 20}<br>Package 30{Class 30} |

FIG. 11

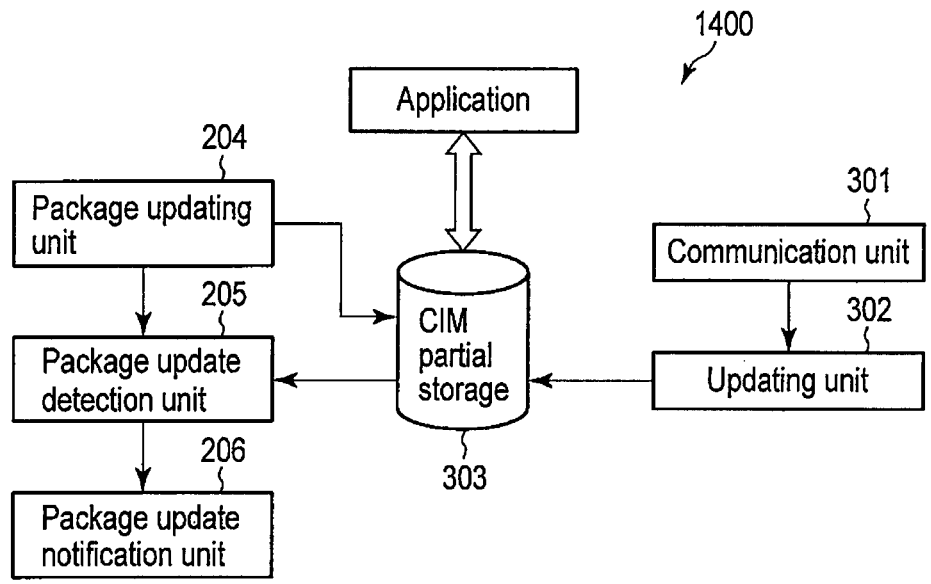
F I G. 1 4
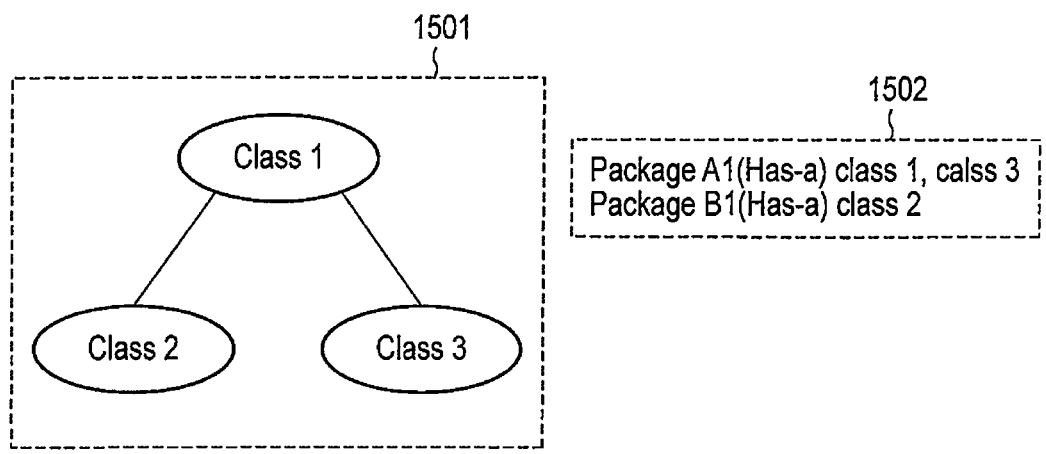
F I G. 1 5

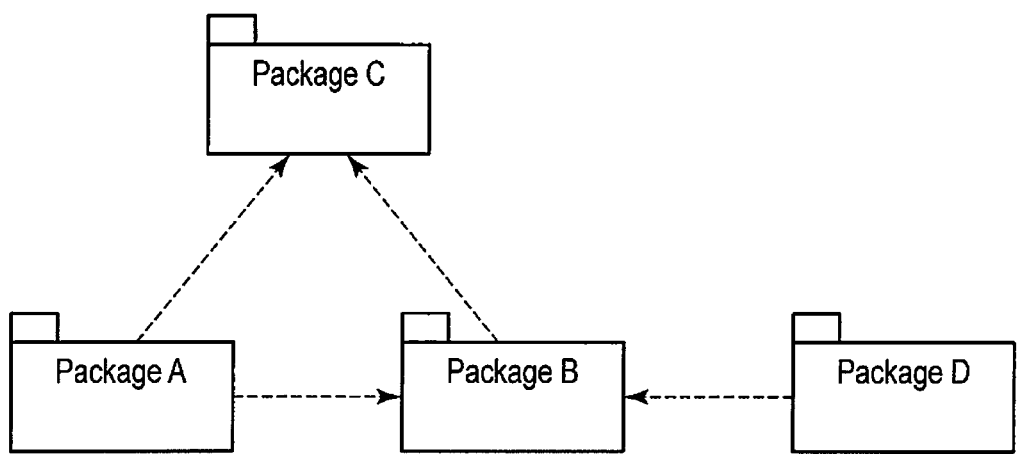
F I G. 16

ONTOLOGY UPDATING APPARATUS, METHOD AND SYSTEM

CROSS-REFERENCE TO RELATED APPLICATIONS

This application is based upon and claims the benefit of priority from prior Japanese Patent Application No. 2011-070795, filed Mar. 28, 2011, the entire contents of which are incorporated herein by reference.

FIELD

Embodiments described herein relate generally to an ontology updating apparatus, method and system.

BACKGROUND

As a known International Standard for the smart grid, International Electrotechnical Commission (IEC) 61968/61970, the so-called Common Information Model (CIM), defines: equipment composing a power system; together with an information model for generation, transmission, transformation, and distribution of power. The CIM provides an application program interface (API) for an energy management system (EMS). The CIM includes definitions, such as for hierarchical classes that define facilities related to a power system, attributes that describe the details of each class, and data types for attributes. In addition, according to application areas, all information items (i.e., objects) in the CIM are grouped into an object defined as a package.

BRIEF DESCRIPTION OF THE DRAWINGS

FIG. 2 is a block diagram of the ontology updating apparatus according to the present embodiment;

FIG. 3 is a block diagram of an application device according to the present embodiment;

FIG. 4 is a conceptual diagram illustrating a CIM;

FIG. 7 is a diagram illustrating an example of a class structure;

FIG. 8 is a diagram illustrating an example of a attribute structure;

FIG. 10 is a diagram illustrating an example of inheritance relationships established by a CIM class hierarchical structure;

FIG. 11 is a diagram illustrating an example of updating reference relationships;

FIG. 14 is a block diagram of an application device according to a modified example;

FIG. 15 is a diagram illustrating examples of "Has-a" and "Is-a" relationships; and FIG. 16 is a diagram illustrating an example of dependency relationships between CIM packages as defined in conventional UML.

DETAILED DESCRIPTION

Figure 1:
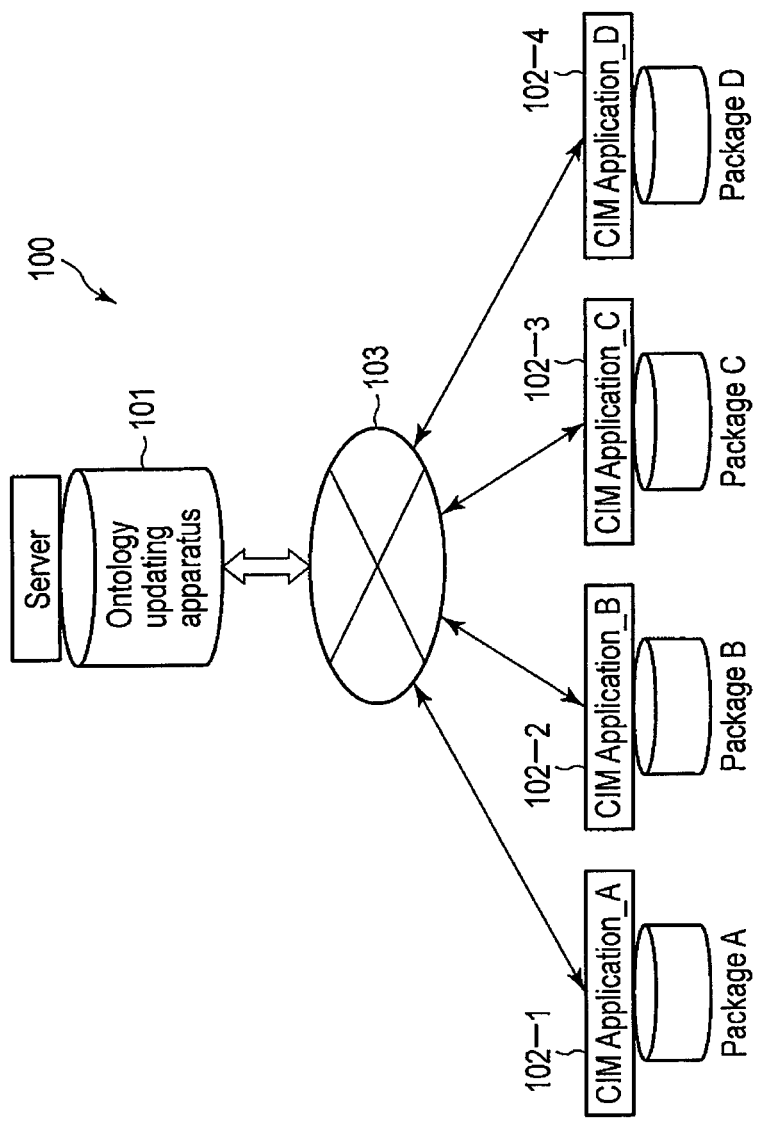
FIG. 1 is a conceptual diagram illustrating an ontology updating system according to the present embodiment.

However, a CIM package is determined from a close relationship with a corresponding business field. Therefore, there are no inheritance relationships that follow a class layer between packages. Moreover, the relationships between packages are defined according to the package-related definition in Unified Modeling Language (UML). Therefore, it may not be determined that by which element (a class, an attribute, or the like) each relationship is established. The packages that should be updated as a result of change in a class or its properties may not be determined. Furthermore, the whole CIM is managed by its being given one version as one file. Therefore, when a CIM element is updated, the whole CIM, which includes packages not needing to be updated, is updated.

However, each application using the CIM often uses some of packages. Accordingly, when one package has been updated, it cannot be determined whether the package for each application should then be updated.

In general, according to one embodiment, an ontology updating apparatus includes a generation unit, an updating unit, a detection unit and a notification unit. The generation unit is configured to generate, if a first class belonging to a first package relates to one or more second classes belonging to one or more second packages, an updating reference relationship indicating that the second packages are associated with the first package, the first package and the second packages each indicating a collection in which hierarchical classes, attributes describing details of the hierarchical classes, and data types are grouped. The updating unit is configured to update, if the first class is to be updated, the first class and the first package. The detection unit is configured to detect, using the updating reference relationship, whether or not at least one of target packages are comprised in the second packages, the target packages each indicating a package to be updated and associated with the updated first class. The notification unit is configured to generate, if the at least one of target packages are comprised in the second packages, an update notice that the at least one of target packages needs to be updated.

Referring to the accompanying drawings, an ontology updating apparatus, method and system according to the present embodiment will be described in detail below. In the description of the embodiment below, parts with the same reference numeral perform the same operation, and duplicate explanation is omitted when appropriate.

An ontology updating system according to the present embodiment will be explained with reference to the block diagram in FIG. 1.

The ontology updating system 100 includes an ontology updating apparatus 101 and application devices 102. The ontology updating apparatus 101 and the application devices 102 can communicate with each other via a network 103. Each of the application devices 102-1 to 102-4 has one or more packages that are different from one another. The application devices can communicate with one another via the network 103. FIG. 1 shows, as an example, the four application devices 102, each of which has one or more packages. However, the present embodiment is not limited to this, and the number of application devices 102 may be one or more than one. Furthermore, each application device 102 may have more than one package.

The ontology updating apparatus 101 may be a server, for example. The ontology updating apparatus 101 stores a class based on the Common Information Model (CIM) and its hierarchical relationships, an attribute (also called as a property), a data type, a package, and an updating reference relationship between the packages created in the present embodiment. A class defines an object based on the CIM. An attribute describes the details of a class. A package is a collection in which objects including classes, attributes and data types are grouped for a purpose. The details of a package are described below with reference to FIGS. 4 and 5. Using a class belonging to a given package, an updating reference relationship indicates a reference relationship with other packages, and represents by using the inheritance relationships between classes belonging to other packages, a quotation relationship, or an inclusive relationship. The updating reference relationship is described later with reference to FIGS. 9 to 11.

If a class or an attribute is updated, the ontology updating apparatus 101 determines whether or not other packages are also updated in addition to the package to which the class belongs. If it is necessary to update them, an update notice is generated. An update notice indicates that a package needs updating, and includes the contents required for updating. To be more specific, it includes the package to be updated together with the contents of its update, for example.

The application device 102 receives an update notice from the ontology updating apparatus 101, and updates the package stored in the application device 102.

Next, a block diagram for the ontology updating apparatus 101 will be described with reference to FIG. 2.

The ontology updating apparatus 101 includes a CIM storage 201, updating reference relationship generation unit 202 (also, called simply a generation unit), updating reference relationship storage 203, package updating unit 204 (also, called simply updating unit), package update detection unit 205 (also, called simply detection unit), and package update notification unit 206 (also, called simply notification unit).

The CIM storage 201 stores CIM information items, that is, CIM-related information items, such as CIM class, attribute, data type, and package, and, in addition, the CIM storage 201 stores updating reference relationships generated by the updating reference relationship generation unit 202, which is described later.

The updating reference relationship generation unit 202 receives a class and relationships of the class, properties, and packages from the CIM storage 201, and generates an updating reference relationship using the hierarchical structure of the class. Generation of updating reference relationships is described later with reference to FIG. 9.

The updating reference relationship storage 203 receives an updating reference relationship from the updating reference relationship generation unit 202, and stores it in the CIM storage 201.

When the necessity of updating a class belonging to a package arises, the package updating unit 204 updates the class and package stored in the CIM storage 201.

The package update detection unit 205 receives information items about updated classes and packages from the package updating unit 204, and updating reference relationships from the CIM storage 201. Based on the updating reference relationships, the package update detection unit 205 detects a target package for updating, which is any package to be updated other than the updated package. The operation of the package update detection unit 205 is described later with reference to FIG. 12.

The package update notification unit 206 receives information items on a target package to be updated from the package update detection unit 205, generates an update notice for the target package to be updated, and transmits the notice to external devices if needed.

Next, the application device 102 according to the present embodiment will be described with reference to FIG. 3.

The application device 102 according to the present embodiment includes a communication unit 301, an updating unit 302, and a CIM partial storage 303.

The communication unit 301 mutually communicates with the ontology updating apparatus 101. Specifically, the communication unit 301 receives an update notice from the ontology updating unit 101.

The updating unit 302 receives an update notice from the communication unit 301, and updates the package stored in the CIM partial storage 303.

The CIM partial storage 303 stores a specific package based on the CIM, the class belonging to this package, its attributes, and other information items. Moreover, if any update is made by the updating unit 302, the updated package is stored.

Next, the concept of the CIM adopted in the present embodiment will be explained with reference to FIG. 4.

FIG. 4 shows an example of a list of the packages used in the CIM. In the CIM, a model is described using Unified Modeling Language (UML), and objects such as class, properties, and data type, are defined. Moreover, referring to IEC 61970, which defines the CIM (the CDV version, 57/1032/CDV, committee draft for vote) and IEC 61968 (the FDIS version, final draft international standard), they are classified into packages according to field, and are organized. In the present embodiment, from the package according to IEC 61970 and the package according to IEC 61968, the required package is selected or both packages are adopted as a CIM.

Figure 5:
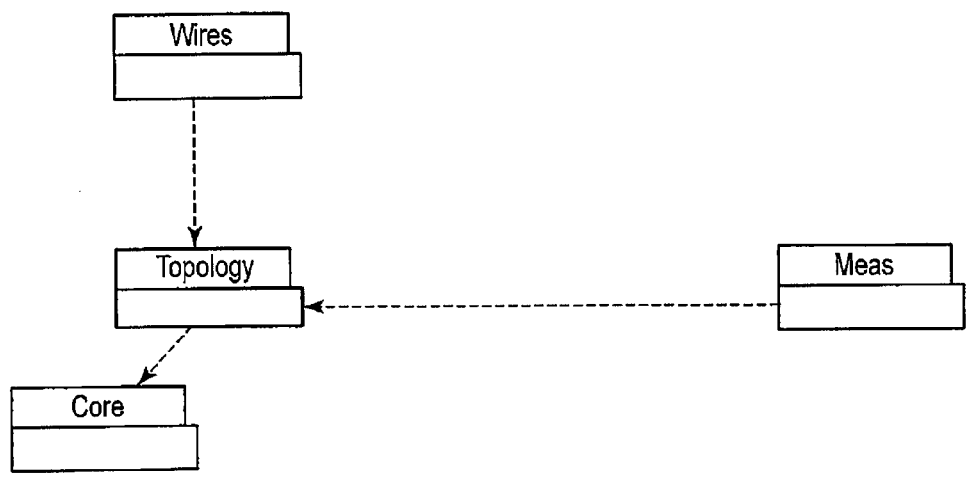
FIG. 5 is a diagram illustrating an example of a dependency relationship between packages.

Next, an example of a package according to general IEC 61970 is shown in FIG. 5.

The dependency relationships between the packages are shown in FIG. 5, and each block represents a package. For example, the "Topology" package has dependency relationships, which are defined by UML, with "Wires", "Meas" and "Cores". However, in the CIM, since inheritance relationships are established by the hierarchical structure of a class. Therefore, it may not be determined from the dependency relationships between the packages alone that relationships between packages are established by which class/classes or attributes.

Next, an example of the class hierarchy structure of the packages is explained with reference to FIG. 6.

Figure 6:
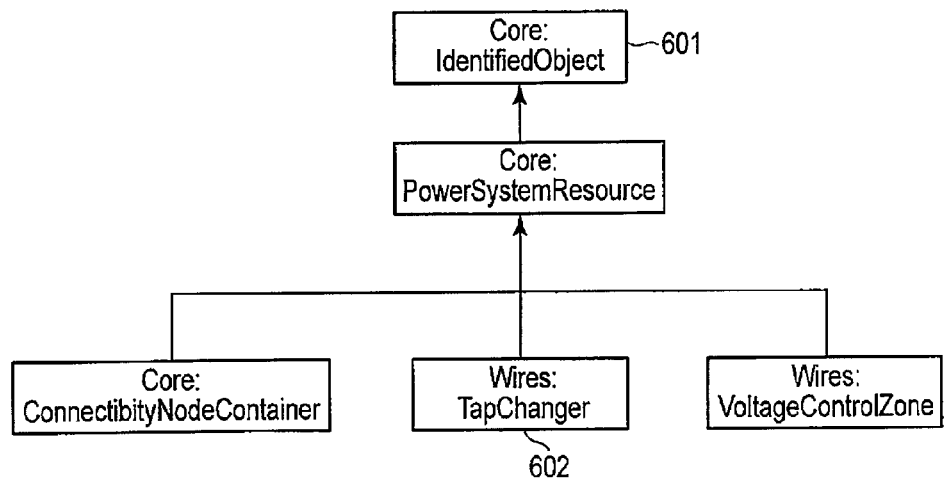
FIG. 6 is a diagram illustrating the hierarchical structure of a class of packages.

FIG. 6 shows an example of the class hierarchy structure defined in the CIM.

Each block represents a class, and the arrows represent the hierarchical relationships. The classes indicated by the arrows represent parent classes. Moreover, the "Core" in "Core::identifiedObject" in class 601 refers to a package name and "identifiedObject" refers to a class name. The package to which a class belongs is described in such a manner. "Wires:TapChanger" in class 602 is defined by "Wires" and the package to which this class 602 belongs is a "Wires" package. Thus, the hierarchical structure of a certain package may be expressed using a class belonging to another package.

A Wires package and a Core package have a dependency relationship, but a hierarchical relationship does not exist between two packages. The dependency relationship between a Wires package and a Core package is established by two or more classes. However, when the class of a certain Wires package is updated, it is unclear whether or not a Core package requires updating.

Next, an example of the class structure defined in this present embodiment is shown in FIG. 7.

In the example shown in FIG. 7, a class structure defined by the CIM includes a name 701, a type 702, and a note 703. In the present embodiment, a version 704 is given for a class structure. Additionally, each class has: native attributes (self-defined attributes), which are defined by itself; and inherit attributes from its parent and ancestor classes.

Next, an example of an attribute structure in the present embodiment will be described with reference to FIG. 8.

The attribute which the CIM defines has fields for a name 801, a data type (Type) 802, and a note 803 field. In the present embodiment, a field for the version 804 is given. For example, in the example in FIG. 8, the present embodiment gives the name 801 "mRID", the type 802 "String", the notes 803 "Inherited from: IdentifiedObject", and the version 804 "1.1." for the above-mentioned "inherited attributes". For the above-mentioned "self-defined attributes", an explanation of the attribute is described in the note 803.

There is no definition of version information for each class and attribute in current CIM defined in IEC61970/61968. When the CIM has been updated, determining whether each class or attribute has been updated or not requires a mutual comparison between defined texts.

On the other hand, in the present embodiment, the field for version is added to each class and each attribute. Therefore, whether or not a class or an attribute has been updated can be detected by referring to the version field.

Figure 9:
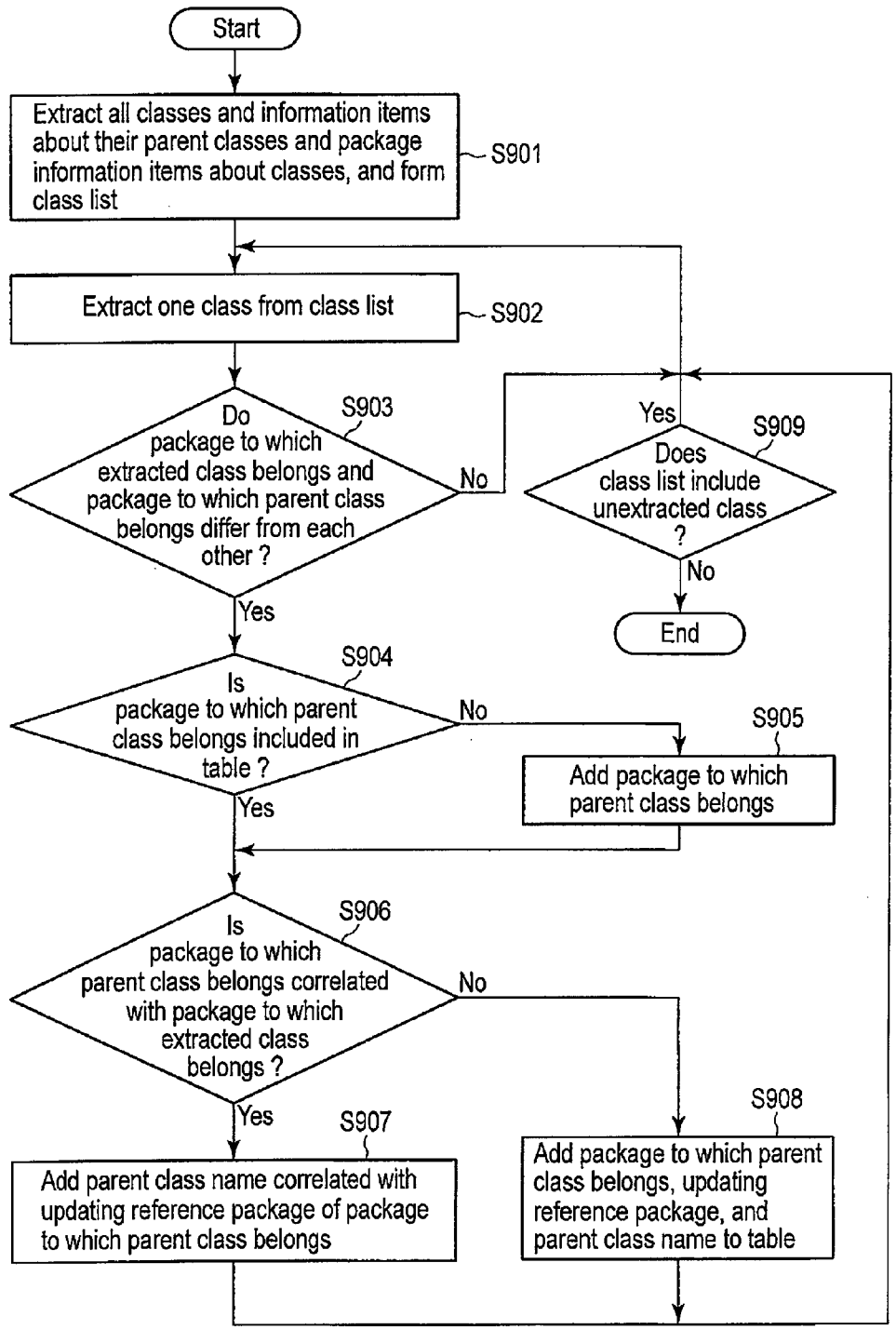
FIG. 9 is a flowchart illustrating the operation of an updating reference relationship generation unit.

The operation of the updating reference relationship generation unit 202 will now be described with reference to the flowchart in FIG. 9.

In step S901, all the classes, the parent class information for each class, and information on the package to which each class and its parent class belongs, are extracted from the CIM storage 201, and a list of classes (a class list) is created.

In step S902, one class is extracted from the list of classes.

In step S903, it is determined whether or not the package to which the extracted class belongs differs from the package to which the parent class belongs. If the packages differ, the operation proceeds to step S904; if the packages are the same, the operation proceeds to step S909.

In step S904, it is determined whether or not the package to which the parent class belongs is registered as a record of the generated updating reference relationship. For example, whether the package name is already registered in the 1101 column in FIG. 11. If the package to which the parent class belongs is already registered, the operation proceeds to step S906; if the package to which the parent class belongs is not registered, the operation proceeds to step S905.

In step S905, the package to which the parent class belongs is registered as a new record of the updating reference relationship table.

In step S906, it is determined whether or not the package to which the parent class belongs and the package to which the extracted class belongs have been already correlated with each other. If they correlate, the operation proceeds to step S907; if they do not correlate, the operation proceeds to S908.

In step S907, a parent class is added to correlate the package to which the parent class belongs with the package to which the extracted class belongs, thus making it possible to indicate by which class the updating reference relationship between the packages has been established in terms of the correlation between the packages. The package to which the extracted class belongs is called an updating reference package (second package).

In step S908, the correlation between the package to which the parent class belongs, an updating reference package, and a class is added to a table as an updating reference relationship. Thus, the process at step S907 or S908 makes it possible to correlate the information items on the parent class and the updating reference package with the package to which the parent class belongs.

In step S909, it is determined whether a list of classes includes any unextracted classes. If there are any unextracted classes, the operation returns to step S902 and the processing from step S902 to step S909 is repeated. If there are no unextracted classes, processing ends. In the updating reference relationship generation unit 202, an updating reference relationship is generated for every package by the foregoing processing.

Next, a specific example of the operation of the updating reference relationship generation unit 202 is explained with reference to FIGS. 10 and 11.

FIG. 10 shows an example of the inheritance relationship defined in a CIM class hierarchy structure. A class 1 is the root class belonging to a package C. Class 1 has two sub-classes, a class 2 belonging to a package A, and a class 3 belonging to a package B. Moreover, there is a class 4 belonging to package B, and a class 5 belonging to package A as sub-classes of class 3. Further, as a sub-class of class 4, there is a class 6 belonging to package A. Moreover, in the foregoing inheritance relationships, the attributes of the parent and ancestor classes are inherited. In the example in FIG. 10, class 3 is the parent class of class 5, and class 5 inherits all the attributes of class 3.

Furthermore, a class 100 that belongs to a package D is correlated with class 3, for use as an import relationship ("case-of"). The import relationship indicates a case where a certain class imports at least part of the defining attributes of the imported classes that have no hierarchical inheritance relationships. Specifically, in the case of FIG. 10, class 3 and class 100 have an import relationship, and class 100 inherits at least some of the defining attributes of class 3. This import relationship is applied the same as the hierarchical relationship when creating the updating reference relationship.

Moreover, an inclusive relationship ("part-whole") is also applied the same as the hierarchical relationship when creating the updating reference relationship. An inclusive relationship indicates that the attributes of a certain class are a subset of other classes.

FIG. 11 shows a table of updating reference relationships generated by the updating reference relationship generation unit 202 based on the hierarchical structure of the class shown in FIG. 10.

In the present embodiment, package name 1101, package code 1102, package explanation 1103, package version 1104, creation date 1105, updating reference package list ("Dependent_by") 1106, and updating reference package {class name} (Package {related_class}) 1107 are fields for each package. The updating reference relationships of one package are stored in one row as a record. For example, the updating reference relationship 1108 shows the updating reference relationships of package A. In the present embodiment, although the above fields are included in the updating reference relationships, the updating relationships may only include the fields such as the package name 1101, package version 1104, the updating reference package list 1106, and updating reference package {class name} 1107.

The package name 1101 is the name of a package defined by CIM standard. The package code 1102 is an identifier for identifying the package. The package explanation 1103 is an explanatory note for the package defined by CIM standard or an explanation for use by other packages. The package version 1104 is the version number of the package, and this number is assigned per embodiment or with the version number assigned to a package by CIM when available. For example, initial values can be set to 1. The creation date 1105 is the date on which the updating reference relationship is created. The updating reference package list 1106 is a list of the names of updating reference packages associated with the names of the packages. In addition, an updating reference package and the type of updating reference relationship (e.g., quotation relationship and inclusive relationship) may be described. For each package, the updating reference package {class name} 1107 gives the name of an updating reference package and the class that establishes a dependency relationship with the updating reference package.

Figure 12:
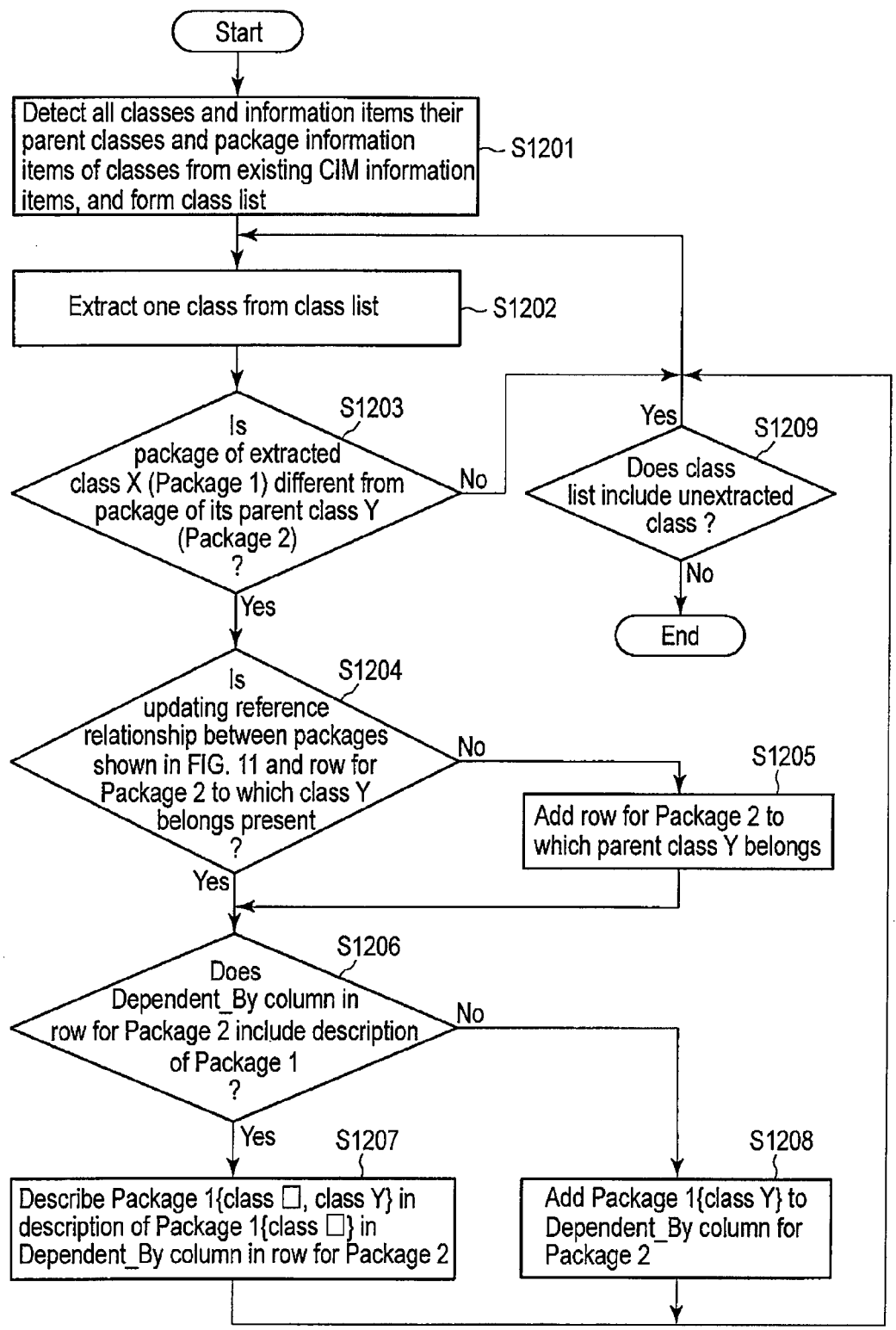
FIG. 12 is a flowchart illustrating a specific example of the operation of the updating reference relationship generation unit.

A specific example of the operation of the updating reference relationship generation unit 202 will now be described with reference to the flowchart shown in FIG. 12.

In step S1201, all classes, the parent class information item for each class, and information item of the package to which each class belongs are detected from CIM information items (existing CIM information items) stored in the CIM storage 201, and a class list is created.

In step S1202, one class, for example, a class X (package 1) is extracted from a list of classes.

In step S1203, it is determined whether or not the package (Package 1) to which the extracted class X belongs, and the package (Package 2) to which a parent class Y (which is a higher ranking layer of the extracted class) belongs, are different from each other. If the packages are different (YES), the operation proceeds to step S1204; if they are the same (NO), the operation proceeds to step S1209.

In step S1204, it is determined whether or not the row for Package 2 to which the parent class Y belongs is present in the table of generated updating reference relationships (shown in FIG. 11). If Package 2 to which the parent class belongs is present (YES), the operation proceeds to step S1206; if Package 2 to which the parent class belongs is not present (NO), the operation proceeds to step S1205.

In step S1205, the row for Package 2 to which the parent class Y belongs is added to the table.

In step S1206, it is determined whether or not the row for Package 2 to which the parent class Y belongs is added, and Package 1 to which the extracted class X belongs, have already been correlated with each other. Specifically, it is determined whether the column, "Dependent_By", in the row for Package 2, includes a description of Package 1. If it includes such a description, the operation proceeds to step S1207; if it does not, the operation proceeds to step S1208.

In step S1207, the parent class Y is added to the column (Dependent_by) correlating with Package 2 to which the parent class Y belongs with Package 1 to which the extracted class X belongs.

In step S1208, Package 2 to which the parent class Y belongs, updating reference Package 1, and class X are associated with one another for the updating reference relationship.

In step S1209, it is determined if there are any unextracted (unprocessed) classes in the list of classes. If there are any unextracted classes, the operation returns to step S1202 and the processing from step S1202 to step S1209 is repeated. If there are no unextracted classes, processing ends.

Further, a specific example of the generation of an updating reference correlation will now be described with reference to FIG. 11.

For an updating reference relationship with package B, "package A" is first added to a list 1106 of the updating reference packages, to which updating reference is made for package B. Then, since the updating reference correlation of "package A" with the "package B" is established by class 3 belonging to package B, package A {class 3} is added to the column for the updating reference package {class name} 1107. Similarly, class 6 belonging to package A includes a hierarchical relationship in which class 4 belonging to package B is a parent class; therefore, package A {class 4} is added to the updating reference package {class} 1107. Consequently, these additions take the form of package A {class 3 and class 4}. Since the updating reference relationship generation unit 202 processes for each package in such a manner, an updating reference relationship can be generated for each package.

The "packages D" shown in the updating reference packages 1106 for package B has a quotation relationship. A package having a quotation or inclusive relationship as an updating reference package is also included in the updating reference relationships.

Next, operation of the ontology updating apparatus 101 will be described with reference to the flowchart in FIG. 13.

In step S1301, the package updating unit 204 updates the version of a class according to an update notice.

In step S1302, the package updating unit 204 updates the package to which the updated class belongs.

In step S1303, the package update detecting unit 205 determines whether or not the updated package has a list of updating reference packages. If there is a list of updating reference packages (1106), the operation proceeds to step S1304; if there are no updating reference packages, the processing ends.

In step S1304, the package update detection unit 205 detects whether or not there are, among the updating reference packages of the updated package, any updating reference packages (1107) correlating with the updated class. If there are no updating reference packages 1107 correlating with the updated class, updating only the package to which the updated class belongs is sufficient. Hereinafter, an updating reference package correlating with an updated class is called a target package to be updated. If there remain any target packages to be updated, the operation proceeds to step S1305; if there do not, processing ends.

In step S1305, the package update notification unit 206 generates an update notice for the target package to be updated. Thereafter, the operation returns to step S1303, and the processing from step S1303 to step S1305 is repeated until no target packages remain to be updated.

Referring to FIG. 11, a detailed explanation will be given based on the assumption that class 4 has been updated.

First, the version of class 4 is updated and package B to which class 4 belongs is updated. Then, if referring to the updating reference package list 1106 shown in FIG. 11, packages A and D are correlated with package B as updating reference packages. Further, if an updating reference package {class} 1107 is referred to, package A depends on classes 3 and 4 of package B, and package D depends on class 3 of package B. It can therefore be determined that package D is not affected by updating of class 4; only package A is affected by the update. That is, transmitting an update notice only for applications used by package A, which is the package to be updated, is sufficient. Therefore, the minimum updating required can be performed without updating other packages unnecessarily.

Figure 13:
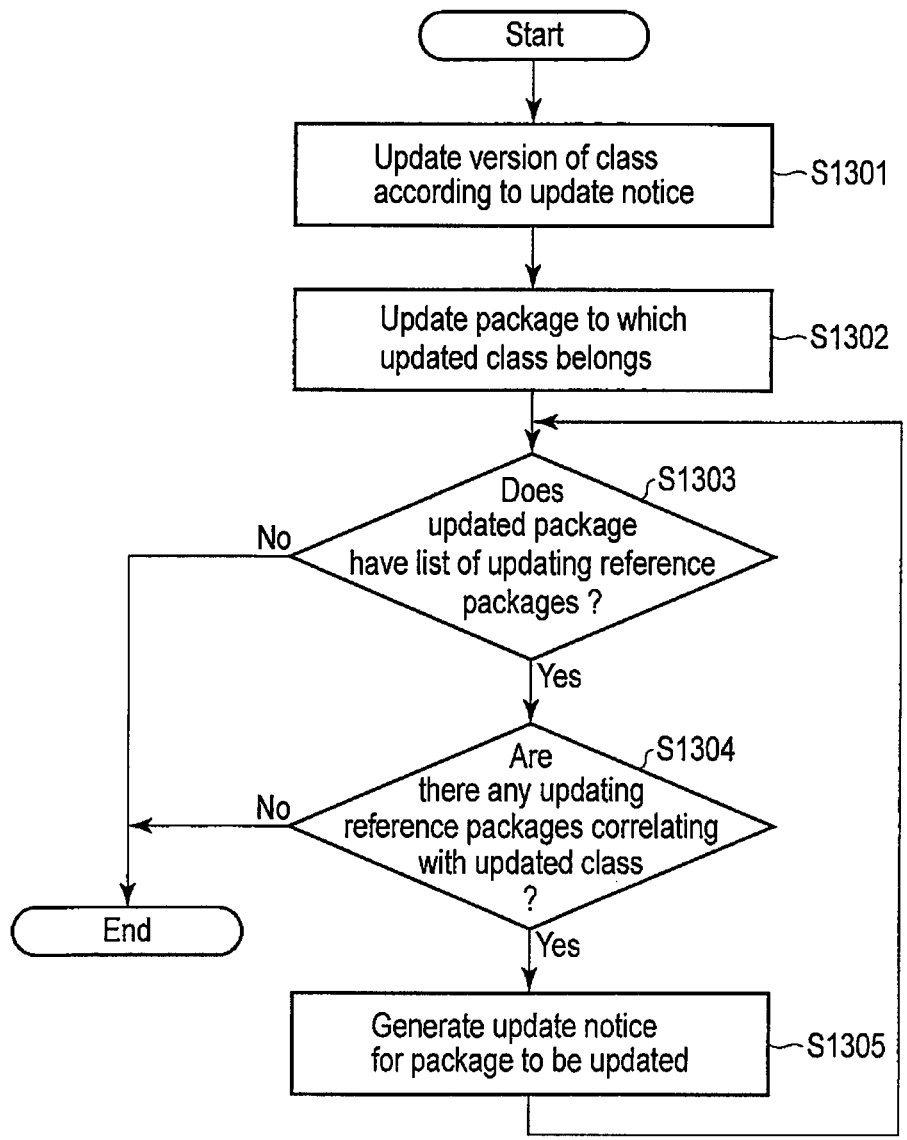
FIG. 13 is a flowchart illustrating the operation of the ontology updating apparatus.

In addition, it is desirable that, after package A is updated, the process having as an input step S1302 in FIG. 13 be repeated for package A, thereby detecting all packages to be updated.

Modified Example of the Present Embodiment

In the ontology updating system 100 shown in FIG. 1, the ontology updating apparatus 101 (server) transmits an update notice to each application device 102. However, in this modified example, the generated updating reference relationships between the packages are stored in each application device 102.

FIG. 14 shows a block diagram of an application device according to the modified example.

The application device 1400 according to the modified example includes a package updating unit 204, package update detection unit 205, package update notification unit 206, communication unit 301, updating unit 302, and CIM partial storage 303. Since each block of the application device 1400 performs the same operation as each block shown in FIGS. 2 and 3, their explanations are omitted here.

Next, operation of the application device 1400 according to the modified example will be described.

First, the updating reference relationships between the packages are stored in the CIM partial storage 303. When each application device 1400 updates information items for use, the package updating unit 204 updates any required packages.

From the updating reference relationships stored in the CIM partial storage 303, a target package to be updated is detected from a list of updating reference packages detected by the package update detection unit 205 using the processing shown in FIG. 13. Then, the package update notification unit 206 transmits to an application with a target package to be updated, an update notice for the updating of that target package.

Updating in the application may be affected by updating in other applications. In this case, the communication unit 301 receives an update notice, and the updating unit 302 updates the target package to be updated, which has been stored in the CIM partial storage 303.

The relationship between "Has-a" (i.e., part-whole) and "Is-a" (i.e., hierarchy), as used in the present embodiment, will now be explained with reference to FIG. 15.

The hierarchical structure formed by class 1, class 2, and class 3 has an "Is-a" relationship 1501, together with inheritance relationships. On the other hand, a package structure according to the present embodiment has a "Has-a" relationship 1502 in which package A1 has a class 1 and a class 3, and package B1 has a class 2. Generally, there is no inheritance relationship between packages A1 and B1.

As a comparative example, the dependency relationships between the CIM packages, as defined in conventional UML, are shown in FIG. 16.

A conventional dependency relationship between packages is established with element relationships between packages. However, which relationship has been established with which element may not be determined from dependency relationships between packages alone. For example, if package B is updated, packages A and D dependent on package B will also be updated, which requires an additional operation for the update of package D. In the present embodiment, a determination can be made as to which class establishes dependency relationships between the packages. Accordingly, only required packages can be updated.

In the foregoing embodiment, giving rise to updating reference relationships between the packages prevents the packages from being updated unnecessarily when a class is updated; and enables updating of only a package/packages that need to be updated, thus performing an efficient updating process.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An ontology updating apparatus, comprising:
a memory device storing instructions; and
a processor that executes the instructions and is configured to:
generate, if a first class belonging to a first package relates to one or more second classes belonging to one or more second packages, an updating reference relationship indicating that the second packages are associated with the first package, the first package and the second packages each indicating a collection in which classes including the first class and the one or more second classes, attributes describing details of the classes, and data types are associated;
update, if the first class is to be updated, the first class and the first package;
detect, using the updating reference relationship, whether or not at least one of target packages are comprised in the second packages, the target packages each indicating a package to be updated and each including at least one of the one or more second classes associated with the updated first class; and
generate, if the at least one of target packages are comprised in the second packages, an update notice that the at least one of target packages needs to be updated.

2. The apparatus according to claim 1, wherein the processor is further configured to detect whether or not there is at least one of third packages, fourth packages and fifth packages, as a target package, each of the third packages differing from the updated first package and being a package to which a third class in a sub-class of the first class belongs, each of the fourth packages being a package to which a fourth class having a quotation relationship belongs, the quotation relationship using at least part of properties of the updated first class, and each of the fifth packages being a package to which a fifth class having an inclusive relationship belongs, the inclusive relationship using properties of the updated first class as a sub-set.

3. The apparatus according to claim 1, wherein the processor is further configured to generate, if a fourth package including a fourth class that differs from a third package, the updating reference relationship indicating that the fourth package is associated with the third package, the third package including at least one of a parent class of the fourth class, a third class having a quotation relationship with the fourth class, and a fifth class having an inclusive relationship with the fourth class.

4. An ontology updating method comprising:
generating, if a first class belonging to a first package relates to one or more second classes belonging to one or more second packages, an updating reference relationship indicating that the second packages are associated with the first package, the first package and the second packages each indicating a collection in which classes including the first class and the one or more second classes, attributes describing details of the classes, and data types are associated;
updating, if the first class is to be updated, the first class and the first package;

detecting, using the updating reference relationship, whether or not at least one of target packages are comprised in the second packages, the target packages each indicating a package to be updated and each including at least one of the one or more second classes associated with the updated first class; and generating, if the at least one of target packages are comprised in the second packages, an update notice that the at least one of target packages needs to be updated.

5. The method according to claim 4, wherein the detecting whether or not the at least one of target packages detects whether or not there is at least one of third packages, fourth packages and fifth packages, as a target package, each of the third packages differing from the updated first package and being a package to which a third class in a sub-class of the first class belongs, each of the fourth packages being a package to which a fourth class having a quotation relationship belongs, the quotation relationship using at least part of properties of the updated first class, and each of the fifth packages being a package to which a fifth class having an inclusive relationship belongs, the inclusive relationship using properties of the updated first class as a sub-set.

6. The method according to claim 4, wherein if a fourth package to which a fourth class belongs differs from a third package, the generating the updating reference relationship generates the updating reference relationship indicating that the fourth package is associated with the third package, the third package including at least one of a parent class of the fourth class, a third class having a quotation relationship with the fourth class, and a fifth class having an inclusive relationship with the fourth class.

7. An ontology updating system, comprising:
a server comprising:
a first memory device storing first instructions; and,
a first processor that executes the first instructions and is configured to:
generate, if a first class belonging to a first package relates to one or more second classes belonging to one or more second packages, an updating reference relationship indicating that the second packages are associated with the first package, the first package and the second packages each indicating a collection in which classes including the first class and the one or more second classes, attributes describing details of the classes, and data types are associated; and
an application apparatus connected to the server via a network, the application apparatus comprising:
a partial storage configured to store at least one of the one or more second packages, at least one of the one or more second classes, and the updating reference relationship;
a second memory device storing second instructions; and
a second processor that executes the second instructions and is configured to:
detect, using the updating reference relationship, if at least one of the one or more second classes is to be updated based on an update to the first class, whether or not at least one of target packages are comprised in at least one of the one or more second packages, the target packages each indicating a package to be updated and associated with the updated first class;
generate, if the at least one of target packages are comprised in the second packages, an update notice that the at least one of target packages needs to be updated;
update the at least one of the one or more second classes and the at least one of the one or more second packages if the at least one of the one or more second classes are to be updated; and
update, if the update notice is received, the target package to be updated.

8. The system according to claim 7, wherein the second processor is further configured to detect whether or not there is at least one of third packages, fourth packages and fifth packages, as a target package, each of the third packages differing from an updated first package and being a package to which a third class in a sub-class of the first class belongs, each of the fourth packages being a package to which a fourth class having a quotation relationship belongs, the quotation relationship using at least part of properties of the updated first class, and each of the fifth packages being a package to which a fifth class having an inclusive relationship belongs, the inclusive relationship using properties of the updated first class as a sub-set.

9. The system according to claim 7, wherein the first processor is further configured to generate, if a fourth package, including a fourth class differs from a third package, the updating reference relationship indicating that the fourth package is associated with the third package, the third package including at least one of a parent class of the fourth class, a third class having a quotation relationship with the fourth class, and a fifth class having an inclusive relationship with the fourth class.

* * * * *